United States Patent
Mogensen et al.

[11] Patent Number: 5,350,641
[45] Date of Patent: Sep. 27, 1994

[54] SOLID STATE FUEL CELL AND PROCESS FOR THE PRODUCTION THEREOF

[75] Inventors: Mogens Mogensen, Bjaeverskov; Bruno Kindl, Roskilde, both of Denmark

[73] Assignee: Forskningscenter Riso, Roskilke, Denmark

[21] Appl. No.: 107,665
[22] PCT Filed: Feb. 12, 1992
[86] PCT No.: PCT/DK92/00046
§ 371 Date: Aug. 12, 1993
§ 102(e) Date: Aug. 12, 1993
[87] PCT Pub. No.: WO92/15122
PCT Pub. Date: Sep. 3, 1992

[30] Foreign Application Priority Data
Feb. 13, 1991 [DK] Denmark .................. 249/91

[51] Int. Cl.$^5$ .............................. H01M 8/10
[52] U.S. Cl. ........................ 429/30; 429/33; 427/115
[58] Field of Search .................. 429/30-33; 427/115; 29/623.5

[56] References Cited

U.S. PATENT DOCUMENTS

| | | | |
|---|---|---|---|
| 4,812,329 | 3/1989 | Isenberg | 427/115 |
| 4,894,297 | 1/1990 | Singh et al. | |
| 5,106,706 | 4/1992 | Singh et al. | 429/31 |
| 5,217,822 | 6/1993 | Yoshida et al. | 429/33 |
| 5,234,722 | 8/1993 | Uto et al. | 429/33 X |

FOREIGN PATENT DOCUMENTS 0253459 5/1986 European Pat. Off.
0388558 9/1990 European Pat. Off.

*Primary Examiner*—Anthony Skapars
*Attorney, Agent, or Firm*—Hill, Steadman & Simpson

[57] ABSTRACT

A solid state fuel cell for oxidation of $CH_4$ includes a solid state electrolyte that is preferably formed by YSZ (yttrium stabilized zirconium oxide). A surfactive metal oxide is applied onto the electrolyte followed by application of a thin layer of $CeO_2$-based ceramics serving as an anode. If desired, MgO can be added in order to improve the volume stability.

16 Claims, 2 Drawing Sheets

SOLID STATE FUEL CELL AND PROCESS FOR THE PRODUCTION THEREOF

TECHNICAL FIELD

The invention relates to a solid state fuel cell for oxidation of $CH_4$, where the solid state electrolyte is preferably formed by YSZ (yttrium oxide stabilized zirconium oxide).

BACKGROUND ART

A conventional solid state fuel cell comprises a solid state electrolyte, a solid state cathode, and a cermet anode. The operating temperature of a stack of solid state cells is approximately 1000° C. The electrolyte contains usually a $Y_2O_3$—$ZrO_2$ mixture oxide, a so called yttrium oxide stabilized zirconium oxide (YSZ). The cathode is usually composed of $LaMnO_3$ doped with Sr, Mg or Ca, and the anode is usually composed of a mixture of fine Ni-particles and YSZ. The nickel-YSZ-oxide cermet anode is usually produced by mixing NiO with YSZ ($Zr_{1-x}Y_xO_2$—x/2). The latter oxide mixture is sintered on the electrolyte. When the fuel cell operates, and $H_2$ or $CH_4$ is transferred to the anode, NiO is reduced to Ni. Such a cermet anode must be porous in such a manner that the fuel gas can escape and react with $O^{--}$-ions from the YSZ electrolyte at the same time as it releases electrons to the nickel metal. Accordingly, the anode reaction can only take place in a transition area between the three phases YSZ, Ni, and fuel gas. The anode reaction is as follows:

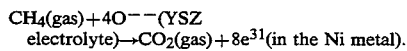

$$CH_4(gas) + 4O^{--}(YSZ\ electrolyte) \rightarrow CO_2(gas) + 8e^{31}(\text{in the Ni metal}).$$

A conductive path or percolation path must be provided through the Ni-phase in order to allow removal of the electrons, the path being ensured by the % by volume of Ni exceeding 35%.

However, when $CeO_2$-based anodes are used, a reduction by way of $H_2$ or $CH_4$ results in formation of understoichiometric $CeO_{2-x}$ capable of conducting both electrons and oxygen ions. An oxidation of $H_2$ or $CH_4$ can on such an anode be carried out on the entire surface, i.e. the gas transition zone, $e^-$ and $O^{--}$ simultaneously being available everywhere on the surface. The latter is of particular importance in connection with oxidation of $CH_4$ presenting the main component in natural gas. The surface density, i.e. the reaction rate, in connection with understoichiometric $CeO_{2-x}$ is up to a 100 times higher than in connection with a Ni—YSZ cermet anode.

According to a conventional way of adhering a thin layer of ceramics, such as $CeO_2$, onto another material, such as YSZ, the $CeO_2$ powder is suspended in a suitable, viscous liquid spread over the already produced YSZ followed by heating to 1200° to 1600° C. for 1 to 5 hours. Subsequently, the $CeO_2$ powder is sintered to an approximately compact layer capable of adhering to YSZ. During the heating, the $CeO_2$ and YSZ diffuse into one another, $CeO_2$ diffusing faster than YSZ, whereby porosities arise about the original YSZ surface due to the so called Kirkendall effect. The porosities reduce the mechanical strength with the result that the structure cracks. When the sintering temperature is kept low and the sintering period is short, the formation of porosities can indeed be reduced, but the sintering of the $CeO_2$ electrode is, however, poor and results in a mechanically weak structure.

The diffusing of $CeO_2$ into YSZ involves the additional problem that a poor electrical conductivity is achieved in the $CeO_2$—YSZ mixture area. Accordingly, a voltage drop arises in the area due to the high resistance.

DESCRIPTION OF THE INVENTION

An object of the invention is to provide a solid state fuel cell for oxidation of $CH_4$ with a $CeO_2$-based electrode being mechanically stable and in good electric contact with the electrolyte.

A solid state fuel cell of the above type is according to the invention characterized in that a thin layer of $CeO_2$-based ceramics is fastened to the electrolyte and serves as an anode, a surfactive metal oxide also being applied between the electrolyte and the ceramic layer.

By adding NiO or another transition metal oxide which is surfactive on YSZ to the $CeO_2$, $CeO_2$ is prevented from diffusing into YSZ. Alternatively, a layer of such a metal oxide powder suspended in a dispersion medium can be painted on the YSZ electrolyte followed by application of the $CeO_2$ powder. By the expression surfactive is meant that the metal oxide, such as $MnO_2$ or NiO, is easy to distribute uniformly on the YSZ surface as well as that the oxide does not clot in spots on the YSZ surface during the heating process. The measure can alternatively be performed by admixing up to 30% by weight of NiO into the $CeO_2$-based ceramic powder. It is assumed, that a very low content of NiO suffices. Alternatively, assumed suitable auxiliary oxides are oxides of the transition metals V, Cr, Mn, Fe, Co, Cu, Zn, Nb, Ta and of Ca, Ge, In, Sn, Sb, Pb, and Bi.

The auxiliary oxide has partly the effect that the YSZ surface thereof is completely covered and accordingly prevents $CeO_2$ from diffusing into YSZ, and partly the effect that it adheres the two materials to one another by a low transition surface tension to both YSZ and $CeO_2$ A proviso applying to the auxiliary oxide layer for being usable in a solid state fuel cell is that the auxiliary oxide layer serving as an adhesive layer must be penetrable by oxygen ions when the fuel cell is operating. When NiO is used as an auxiliary oxide, the NiO is during the starting phase presumably reduced into metallic Ni due to the effect of hydrogen. As the molar volume of Ni is as low as 6.6 $cm^3$/mole, and the molar volume of NiO is 11.2 $cm^3$/mole, a significant contraction takes place, whereby $CeO_2$ is brought into direct contact with YSZ in such a manner that $O^{--}$ions can move approximately freely from YSZ into $Ce_2$.

When the Ni resulting from the reduction of NiO appears on the $CeO_2$ surface as particles of a diameter of approximately 1 μm or more, problems are likely to arise in connection with the oxidation of $CH_4$, as Ni is a well-known cracking catalyst. Ni exposed into $CH_4$ at 1000° C. is accordingly assumed to cause a separation of carbon, gradually destroying the anode. The latter is apparently the case in the cermet anode described in EP Patent Application No. 388,558, the application not mentioning either that $CH_4$ can be used as fuel gas. The separation of carbon can be avoided by ensuring that almost no Ni is visible on the $CeO_2$, surface, for instance by only applying Ni as a layer onto the YSZ electrolyte and not admixing it into $CeO_2$. A carbon separation can alternatively be avoided by treating the surface with $H_2S$ in the starting phase. When the visible Ni is subjected to $H_2S$ at 1000° C., a NiS layer is formed on the Ni particles with the result that the cracking-catalytic properties disappear. In this manner it is possible to add up to 35 to 40% by weight of Ni, whereby the conductivity of an electrode of understoichiometric $CeO_{2-x}$ can be improved because a treatment by means of $H_2S$ removes the ability of Ni to separate carbon from $CH_4$ in connection with cracking.

Compared to an Ni—YSZ cermet electrode, the Ni—$CeO_{2-x}$ electrode treated with $H_2S$ is in addition tolerant to a possible content of sulphur in $CH_4$. A substantial problem of the conventional Ni—YSZ cermet anode is that it is deactivated when subjected for a prolonged period of time to fuel gas having a sulphur content of the magnitude 100 ppm. Ni-free $CeO_2$-based electrodes are also assumed to be tolerant to a sulphur content in the fuel gas.

A particular problem related to $CeO_2$-based electrodes is that an understoichiometric $CeO_{2-x}$ electrode can break because when some of the $O^{--}$-ions are removed from the crystal lattice to form $CeO_{2-x}$ at the same time as some of the $Ce^{+4}$ ions are reduced into $Ce^{+3}$, the crystal lattice expands partly because less negative $O^{--}$ are present to keep the positive Ce ions together, and partly because a $Ce^{+3}$ ion is larger than a $Ce^{+4}$ ion. A solution to this problem has apparently been found.

When $CeO_2$ is doped with a tri- or divalent metal oxide, such as $Y_2O_3$ or CaO, solid solutions of the type $Ce_{1-y}Y_yo2$—y/2 or $Ce_{1-x}Ca_xO_{2-x}$ are formed Once an excess of oxygen ions, i.e. oxygen ion vacancies, has been introduced into a $Ce_{1-x}Ca_xO_{2-x}$ crystal lattice, it is difficult to form additional oxygen ion vacancies by way of reducing $Ce^{+4}$ into $Ce^{+3}$. The process is as follows:

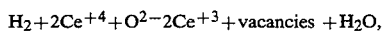

where the vacancies form part as species on equal terms with the ions of the crystal lattice, i.e. already introduced vacancies from a CaO doping displaces the equilibrium to the left.

When the formation of $Ce^{+3}$ and vacancies is stopped by the addition of CaO, the electronic conductivity of the $CeO_2$-based electrode is reduced because the electronic conductivity is provided by the outermost and loosely arranged electron of the $Ce^{+3}$ ion. Accordingly, a lower concentration of $Ce^{+3}$ results in a lower conductivity. Materials, such as $Nb_2O_5$ in which $Nb^{+5}$ is more easily reduced than $Ce^{+4}$, can be added in order to increase the electronic conductivity. The outermost and loosely arranged electron of $Nb^{+4}$ is also mobile. One way of increasing the volume stability of $CeO_2$ is to dope with metal oxides, where the metal ion is smaller than $Ce^{+4}$. As a result, local tensions, i.e. deformations, are introduced into the $CeO_2$ capable of absorbing the local increases of the volume arising during the formation of $Ce^{+4}$ by reaction with $Ce^{+3}$.

Materials which may be doped in $CeO_2$ in order to improve the conductivity are for instance $Nb_2O_5$, $Ta_2O_5$, $TiO_2$, $P_2O_5$, $As_2O_5$, $Bi_2O_3ZnO$, $In_2O_3$, $SO_3$ and $Sb_2O_5$ or mixtures thereof or materials presenting the same mixture by addition of $CeO_2$ followed by a heat treatment, such as the carbonates of the same materials or for instance $Ce(SO_4)_2$ instead of $SO_3$ or $CePO_3$ instead of $P_2O_5$.

Materials to be doped in $CeO_2$ in order to improve the volume stability by reduction are metal oxides, where the metal ion is mono-, di-, or trivalent, such as $Na_2O$, $K_2O$, MgO, CaO, SrO, BaO, $Sc_2O_3$, $Y_2O_3$, $La_2O_3$, $In_2O_3$, $Ga_2O_3$ as well as tri- and divalent lanthanides, $Ti_2O_3$, ZnO, $Al_2O_3$. Oxides with metal ions smaller than $Ce^{+4}$ are apparently particularly suited.

The invention also relates to a process of producing a solid state fuel cell. The process according to the invention is characterized by fastening to the electrolyte a thin layer of $CeO_2$-based ceramic powder admixed a transition metal oxide which is surfactive on the electrolyte. As a result a suitable process for producing the fuel cell is obtained.

DESCRIPTION OF THE PREFERRED EMBODIMENTS OF THE INVENTION

Figure 1:
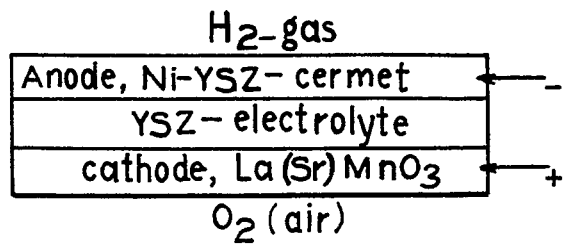
FIG. 1 illustrates a conventional solid state fuel cell.

FIG. 1 illustrates a conventional solid state fuel cell, where the fuel gas is $H_2$. The fuel electrode, the anode, is formed by an Ni—YSZ cermet. The electrolyte is a YSZ electrolyte and the air electrode, the cathode, is formed by $La(Sr)MnO_3$. The thickness of both the electrode and the electrolyte is typically 100 μm. However, considerable variation possibilities exist of from a few μm and up to 0.3 mm for the electrolyte, and 1 mm for the electrodes. The Ni—YSZ anode is very poor as anode for $CH_4$ oxidation.

Figure 2:
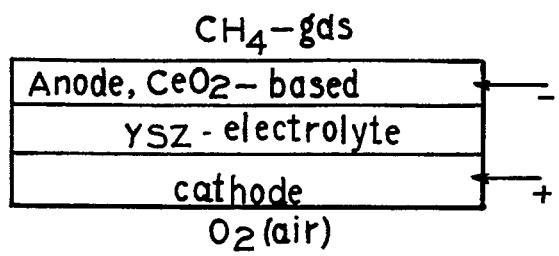
FIG. 2 illustrates a solid state fuel cell according to the invention with a $CeO_2$-based anode.

According to the invention a $CeO_2$-based ceramic is used instead, cf. FIG. 2, the ceramic serving as an anode, a surfactive metal oxide also being applied between the electrolyte and the ceramic layer. In this manner a mechanically stable structure is obtained. The surfactive metal oxide can for instance be oxides of V, Cr, Mn, Fe, Co, Ni, Cu, Zn, Nb or Ta. In order to improve the volume stability it is in addition possible to add alkali metal oxides, MgO, CaO, SrO, BaO, $Sc_2O_3$, $Ti_2O_3$, ZnO, $In_2O_3$, $Ga_2O_3$, $La_2O_3$ or oxides of rare earth metals. In order to improve the electronic conductivity, it is possible to add $Nb_2O_5$, $Ta_2O_5$, $P_2O_5$, $As_2O_5$, ZnO, $In_2O_3$, $Bi_2O_3$, $SO_3$, $Sb_2O_5$ or mixtures thereof.

Figure 3:
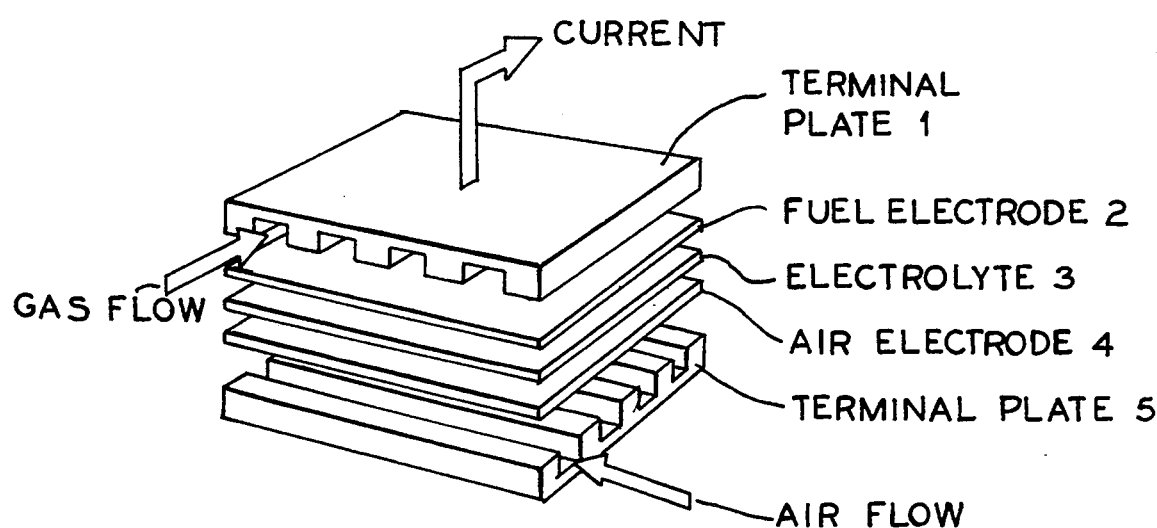
FIG. 3 illustrates a fuel cell which can be repeated in a stack.

FIG. 3 illustrates a single fuel cell which can be repeated in a stack. At the top, the fuel cell comprises a terminal plate 1 of electrically conductive material. The terminal plate 1 is provided with some longitudinal channels for the feeding of fuel gas. A fuel cell electrode 2 of $CeO_2$-based ceramics is provided below the terminal plate 1 and serves as an anode The YSZ electrolyte 3 is provided below the fuel electrode 2. An additional terminal plate 5 with longitudinal channels for the feeding of an air flow is provided below the air electrode 4. The channels in the terminal plate 5 extend transverse to the channels in the terminal plate 1. During operation, the voltage across the cell, i.e. from one terminal plate to the other, is approximately 0.7 V.

Figure 4:
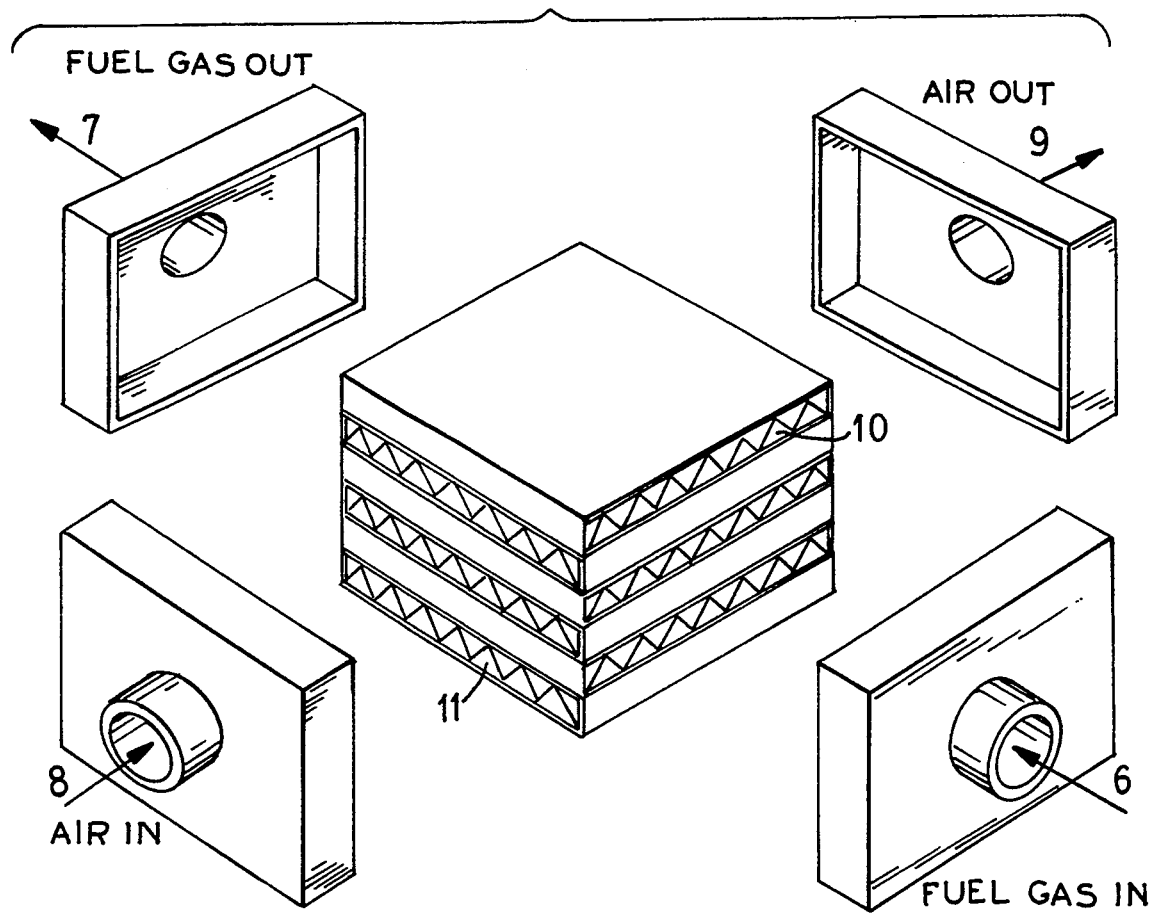
FIG. 4 illustrates a stack of cells with a manifold for fuel gas and air, respectively.

According to the invention it is advantageous to structure a cell stack in connection with a manifold for fuel gas and air, respectively, as illustrated in FIG. 4. Some elongated channels 10, 11 of wavy electrically conductive material are provided between the cells for fuel gas and air, respectively. The wavy layers are arranged such that the flow direction of the air extends transverse to the flow direction of the fuel gas. A common inlet opening 6 and a common outlet opening 7 are provided in connection with the manifolds for fuel gas and a common inlet opening 8 and a common outlet opening 9 are provided for air.

Although other modifications and changes may be suggested by those skilled in the art, it is the intention of the inventors to embody within the patent warranted thereon all changes and modifications as reasonably and properly come within the scope of their contribution to the art.

We claim:

1. A solid state fuel cell for oxidation of $CH_4$, comprising:
   a solid state electrolyte;
   a thin layer of $CeO_2$-based ceramics fastened to said solid state electrolyte and serving as an anode, and
   a surfactive metal oxide applied between said solid state layer.

2. A solid state fuel cell as claimed in claim 1, further comprising:
   a metal oxide added to said thin layer, said metal oxide being surfactive on said solid state electrolyte.

3. A method of making a solid state fuel cell, comprising the steps of:
   initially applying a powder of surfactive metal oxide onto an electrolyte, and
   followed by application of $CeO_2$ powder.

4. A solid state fuel cell as claimed in claim 1, wherein a material selected from the group consisting of: $Nb_2O_5$, $Ta_2O_5$, $TiO_2$, $P_2O_5$, $As_2O_5$, $ZnO$, $In_2O_3$, $Bi_2O_3$, $SO_3$ or $Sb_2O_5$ and mixtures thereof are added to said thin layer to increase electron conductivity.

5. A solid state fuel cell as claimed in claim 1, wherein a material selected from the group consisting of: alkali metal oxides $MgO$, $CaO$, $SrO$, $BaO$, $SC_2O_3$, $Ti_2O_3$, $ZnO$, $In_2O_3$, $Ga_2O_3$, $Y_2O_3$ or $La_2O_3$, and oxides of metals of rare earths are added to said thin layer to improve volume stability.

6. A method for producing a solid state fuel cell
   applying a surface active metal oxide to an electrolyte; and
   applying a thin layer of $CeO_2$-based ceramic on said surface active metal oxide.

7. A method as claimed in claim 6, wherein said surfactive transition metal oxide is a material selected from the group consisting of oxides of V, Cr, Mn, Fe, Co, Ni, Cu, Zn, Nb and Ta.

8. A method as claimed in claim 6, wherein said surfactive transition metal oxide consists substantially of NiO.

9. A method as claimed in claim 8, further comprising the step of:
   mixing up to 30% by weight of NiO into the $CeO_2$-based ceramic powder.

10. A method as claimed in claim 6, wherein said step of applying said surface active metal oxide includes applying a powder of surfactive metal oxide onto the electrolyte, and
    wherein said step of applying said thin layer includes application of $CeO_2$ powder.

11. A method as claimed in claim 6, further comprising the step of:
    adding a material selected from the group consisting of $Nb_2O_5$, $Ta_2O_5$, $TiO_2$, $P_2O_5$, $As_2O_5$, $ZnO$, $In_2O_3$, $Bi_2O_3$, $SO_3$ and $Sb_2O_5$ to said thin layer to increase electron conductivity.

12. A method as claimed in claim 6, further comprising the steps of:
    adding alkali metal oxides selected from the group consisting of $MgO$, $CaO$, $SrO$, $BaO$, $SC_2O_3$, $Ti_2O_3$, $ZnO$, $IN_2O_3$, $Ga_2O_3$, $Y_2O_3$ and $La_2O_3$, and oxides of rare earth metals to said thin layer to improve volume stability.

13. A method as claimed in claim 6, further comprising the step of:
    treating said thin layer with $H_2S$.

14. A method as claimed in claim 13, further comprising the step of:
    adding NiO to said thin layer to increase Ni-content up to 60% by volume.

15. A method as claimed in claim 13, further comprising the step of:
    adding one of iron oxide and cobalt oxide to said thin layer to increase a corresponding one of iron and cobalt content up to 60% by volume.

16. A solid state fuel cell as claimed in claim 1, wherein said solid state electrolyte consists essentially of YSZ (yttrium stabilized zirconiumoxide).

* * * * *

UNITED STATES PATENT AND TRADEMARK OFFICE
CERTIFICATE OF CORRECTION

PATENT NO. : 5,350,641
DATED : Sept. 27, 1994
INVENTOR(S) : Mogens Mogensen, et al It is certified that error appears in the above-indentified patent and that said Letters Patent is hereby corrected as shown below:

In column 1, line 35, change "$8e^{31}$" to --$8e^-$--.

In column 2, line 41, change "$CeO_2$ A" to --$CeO_2$. A--.

In column 3, line 30, change "$Ce_{1-y}Y_{yo}2-y/2$" to --$Ce_{1-y} Y_y O_{2-y/2}$-- and change "formed Once" to -- formed. Once--;
in line 32, change "$Ce_{1-x} Ca_x O_{2-x}$" to --$Ce\ O_2$--;
in line 36, change "$H_2 + 2\ Ce^{+4} + O^{2-} 2\ Ce^{+3}$ + vacancies + $H_2O$" to
--$H_2 + 2\ Ce^{+4} + O^{2-} \leftrightarrow 2\ Ce^{+3}$ + vacancies + $H_2O$--.

Signed and Sealed this

Tenth Day of October, 1995

Attest:

BRUCE LEHMAN

*Attesting Officer*   Commissioner of Patents and Trademarks